United States Patent
Baxter et al.

(10) Patent No.: US 12,152,835 B2
(45) Date of Patent: Nov. 26, 2024

(54) LIQUID COMPONENT SEPARATIONS

(71) Applicant: Sustainable Energy Solutions, Inc., Provo, UT (US)

(72) Inventors: Larry Baxter, Orem, UT (US); Stephanie Burt, Provo, UT (US)

(73) Assignee: Sustainable Energy Solutions, Inc., Orem, UT (US)

( * ) Notice: Subject to any disclaimer, the term of this patent is extended or adjusted under 35 U.S.C. 154(b) by 869 days.

(21) Appl. No.: 16/372,404

(22) Filed: Apr. 2, 2019

(65) Prior Publication Data

US 2020/0318899 A1 Oct. 8, 2020

(51) Int. Cl.
  *F25J 3/06* (2006.01)
  *B01D 1/28* (2006.01)
  *B01D 5/00* (2006.01)
  *B01D 7/00* (2006.01)

(52) U.S. Cl.
  CPC .............. *F25J 3/0615* (2013.01); *B01D 1/28* (2013.01); *B01D 5/006* (2013.01); *B01D 7/00* (2013.01); *F25J 2205/20* (2013.01); *F25J 2220/66* (2013.01); *F25J 2240/02* (2013.01)

(58) Field of Classification Search
  CPC .... F25J 3/0615; F25J 2205/20; F25J 2220/66; F25J 2240/02; F25J 2205/30; F25J 3/0635; F25J 2230/08; F25J 2230/60; F25J 2235/80; F25J 2245/02; F25J 2270/90; F25J 3/061; F25J 3/067; B01D 1/28; B01D 5/006; B01D 7/00; B01D 3/007; B01D 5/0027; B01D 3/06; C10L 3/101; Y02C 20/40
  See application file for complete search history.

(56) References Cited

U.S. PATENT DOCUMENTS

| | | | |
|---|---|---|---|
| 2012/0118012 A1* | 5/2012 | Bailey | C01B 17/167 62/619 |
| 2012/0153514 A1* | 6/2012 | Baxter | B01D 7/02 261/128 |
| 2012/0297821 A1* | 11/2012 | Baxter | F25J 3/067 62/617 |
| 2018/0201849 A1* | 7/2018 | Wormser | C10J 3/485 |
| 2018/0252469 A1* | 9/2018 | Baxter | B01D 53/002 |
| 2023/0025321 A1* | 1/2023 | Abarr | F25J 3/067 |

* cited by examiner

*Primary Examiner* — Miguel A Diaz
*Assistant Examiner* — Ibrahim A. Michael Adeniji
(74) *Attorney, Agent, or Firm* — Cook Alex Ltd.

(57) ABSTRACT

A method and a system for separating components is disclosed. A process liquid stream, containing a first component and a second component, is passed into an expansion device. The process liquid stream is expanded such that the first component and a first portion of the second component vaporize to form a process vapor stream and a second portion of the second component freezes to form a first solid product stream. The first solid product stream passes out of the expansion device. The process vapor stream passes into a direct-contact heat exchanger against a contact liquid stream. The first portion of the second component desublimates into the contact liquid stream as a second solid product stream. The contact liquid stream and the second solid product stream leave the direct-contact heat exchanger as a slurry stream. The process vapor stream leaves the direct-contact heat exchanger as a stripped process vapor stream.

7 Claims, 5 Drawing Sheets

300

301
Pass a process liquid stream, containing first and second components, into an expansion device.

302
Expand the process liquid stream across the expansion device such that the first component and a first portion of the second component vaporize to form a process vapor stream and a second portion of the second component freezes to form a first solid product stream.

303
Pass the first solid product stream out of the expansion device.

304
Pass the process vapor stream into a direct-contact heat exchanger against a contact liquid stream.

305
Desublimate the first portion of the second component into the contact liquid stream as a second solid product stream

401
Pass a supercritical stream, containing first and second components, through a first ICHE.

402
Pass a process liquid stream into an expansion device.

403
Expand the process liquid stream across the expansion device such that the first component and a first portion of the second component vaporize to form a process vapor stream and a second portion of the second component freezes to form a first solid product stream.

404
Pass the first solid product stream out of the expansion device.

405
Pass the process vapor stream into a direct-contact heat exchanger against a contact liquid stream.

406
Desublimate the first portion of the second component into the contact liquid stream as a second solid product stream FIG. 4
(page 1)

400 (continued)

407
Compress the stripped process vapor, resulting in a first product liquid stream.

408
Warm the first product liquid stream across the first ICHE.

409
Separate the slurry stream into a warm contact liquid stream and the second solid product stream.

410
Cool the warm contact liquid stream to produce the contact liquid stream.

411
Combine, melt, and pressurize the first and second solid product streams to produce a second product liquid stream

412
Warm the second product liquid stream across the first ICHE.

FIG. 4
(page 2)

LIQUID COMPONENT SEPARATIONS

GOVERNMENT INTEREST STATEMENT

This invention was made with government support under DE-FE0028697 awarded by the Department of Energy. The government has certain rights in the invention.

TECHNICAL FIELD

The methods and processes described herein relate generally to separation of components.

BACKGROUND

Liquid-liquid separations processes are often energy intensive or complex. Distillation, for example, requires heating the liquid mixture to the point one component becomes a vapor. Distillation towers are often extremely large and expensive, with high operational costs. Alternatives for liquid-liquid separations are needed.

SUMMARY

In a first aspect, the disclosure provides a method for separating components. A process liquid stream, containing a first component and a second component, is passed into an expansion device. The process liquid stream is expanded across the expansion device such that the first component and a first portion of the second component vaporize to form a process vapor stream and a second portion of the second component freezes to form a first solid product stream. The first solid product stream passes out of the expansion device. The process vapor stream passes into a direct-contact heat exchanger against a contact liquid stream. The first portion of the second component desublimates into the contact liquid stream as a second solid product stream. The contact liquid stream and the second solid product stream leave the direct-contact heat exchanger as a slurry stream. The process vapor stream leaves the direct-contact heat exchanger as a stripped process vapor stream.

In a second aspect, the disclosure provides a system for separating components. An expansion device is configured to receive a process liquid stream, containing a first component and a second component, and expand the process liquid stream. The first component and a first portion of the second component vaporize to form a process vapor stream and a second portion of the second component freezes to form a first solid product stream. A desublimating heat exchanger is configured to receive the process vapor stream and pass the process vapor stream across a contact liquid stream. The first portion of the second component desublimates into the contact liquid stream as a second solid product stream. The desublimating heat exchanger is further configured to pass the second solid product stream and the contact liquid stream out as a slurry stream and to pass the process vapor stream out as a stripped process vapor stream.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 3 is a block diagram describing a method for separating components as per one embodiment of the present invention.

FIG. 4 is a block diagram describing a method for separating components as per one embodiment of the present invention.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, passing a gas into a direct-contact exchanger is termed, passing the gas "against" a contact liquid. This refers to both co-current direct-contact exchange and counter-current direct-contact exchange.

Separations of liquid components is a challenge faced by most industries. Distillation, crystallization, and other techniques are often expensive, energy intensive, and complex. The present invention is able to separate liquid components in a simple, thermodynamically efficient manner. The methods and systems described will work for any combination of components where the first component is a compound or combination of compounds that vaporizes while the second component freezes during expansion of the liquid mixture. Expanding the mixture through an expansion device, such as a piston, valve, or other typical expanders, followed by direct contact heat and material exchange to remove a further portion of the second component from the vapor, accomplishes the separation of liquid components simply and efficiently. Further, there is no heat transfer required through the expansion device and energy from the decompression can be recovered and used.

Figure 1:
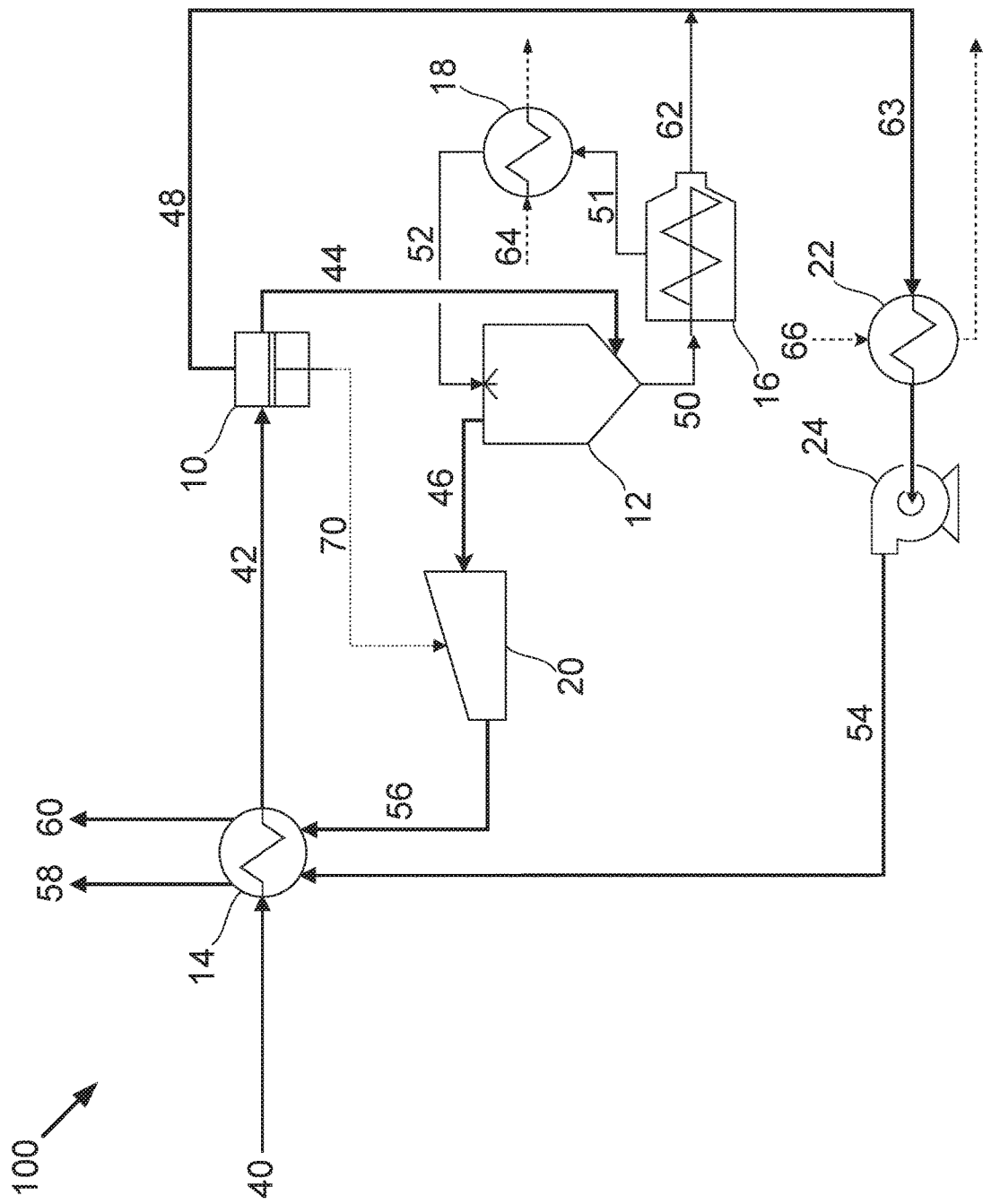
FIG. 1 is a process flow diagram showing a method for separating components as per one embodiment of the present invention.

Now referring to FIG. 1, FIG. 1 is a process flow diagram 100 showing a method for separating components as per one embodiment of the present invention. In this embodiment, a process fluid stream 40 is provided as a supercritical mixture of 30 wt % methane and 70 wt % carbon dioxide at about 60° C. and about 92 bar. The process fluid stream 40 passes through a first indirect-contact heat exchanger (ICHE) 14 where it is cooled isobarically to about −55° C. This is near the point that solid carbon dioxide forms under these conditions (−57° C.), but still above it. The resulting process liquid stream 42 has transitioned from a supercritical fluid to a liquid. The process liquid stream 42 is passed into an expander 10. The expander 10 decreases the pressure of the process liquid stream 42 to about 10 bar, a point at which substantially all of the methane and some of the carbon dioxide flash to form a first vapor stream 44 at the resultant temperature of −80° C. As the process liquid stream 42 changes phase, the first vapor stream 44 absorbs energy and the remaining carbon dioxide in the process liquid stream 42 cools and subsequently freezes at −80° C. and 10 bar as a first solid product stream 48. The first solid product stream 48 is subsequently compressed out of the expander up to as much as 30 bar. In this embodiment, there is only a solid and vapor, with no remaining liquids. In embodiments where there are heavier hydrocarbons, a liquid phase of the heavier hydrocarbons may be formed.

The first vapor stream 44 passes into a desublimating direct-contact heat exchanger 12 where it cools by contact with a contact liquid stream 52. The contact liquid stream 52 is at about −105° C. and cools the first vapor stream 44 isobarically to about −100° C., resulting in a second vapor stream 46. The cooling causes a portion of the remaining carbon dioxide to desublimate as a second solid product, which becomes entrained in the contact liquid stream 52, resulting in a stream of solids suspended in the contact liquid, or a slurry stream 50. The second vapor stream 46, now with no more than 2 mol % carbon dioxide, is compressed through a compressor 20, resulting in a first product liquid stream 56 at about −60° C. and about 92 bar. The first product liquid stream warms isobarically across the first ICHE 14, providing cooling for the incoming process fluid stream 40. In this embodiment, the expander 10 recovers work 70 from the decompression of the process liquid stream 42 and this work 70 provides some of the work to run the compressor 20. In a more preferred embodiment, the second vapor stream 46 contains no more than 1 wt % carbon dioxide. In a most preferred embodiment, the second vapor stream 46 contains no more than 50 ppm carbon dioxide.

The slurry stream 50 is passed through a screw press 16 that separates the contact liquid from the second solid product stream 62 at 30 bar, resulting in a warm contact liquid stream 51 at −80° C. The warm contact liquid stream 51 is cooled against a refrigerant 64 in a second ICHE 18, producing the contact liquid stream 52. In this embodiment, the first and second solid product streams 48 and 62 are combined to form a combined solid product stream 63. The combined solid product stream 63 is warmed against refrigerant 66 in a third ICHE 22 and pressurized in a pump 24, resulting in a liquid product stream 54 at about −57° C. and at least 70 bar, more preferably 100 bar, most preferably 150 bar. The liquid product stream 54 is then warmed across the first ICHE 14, providing cooling for the incoming process fluid stream 40.

In some embodiments, the expander is a piston, turbine, or other device. In other embodiments, the expander is an expansion valve.

Figure 2:
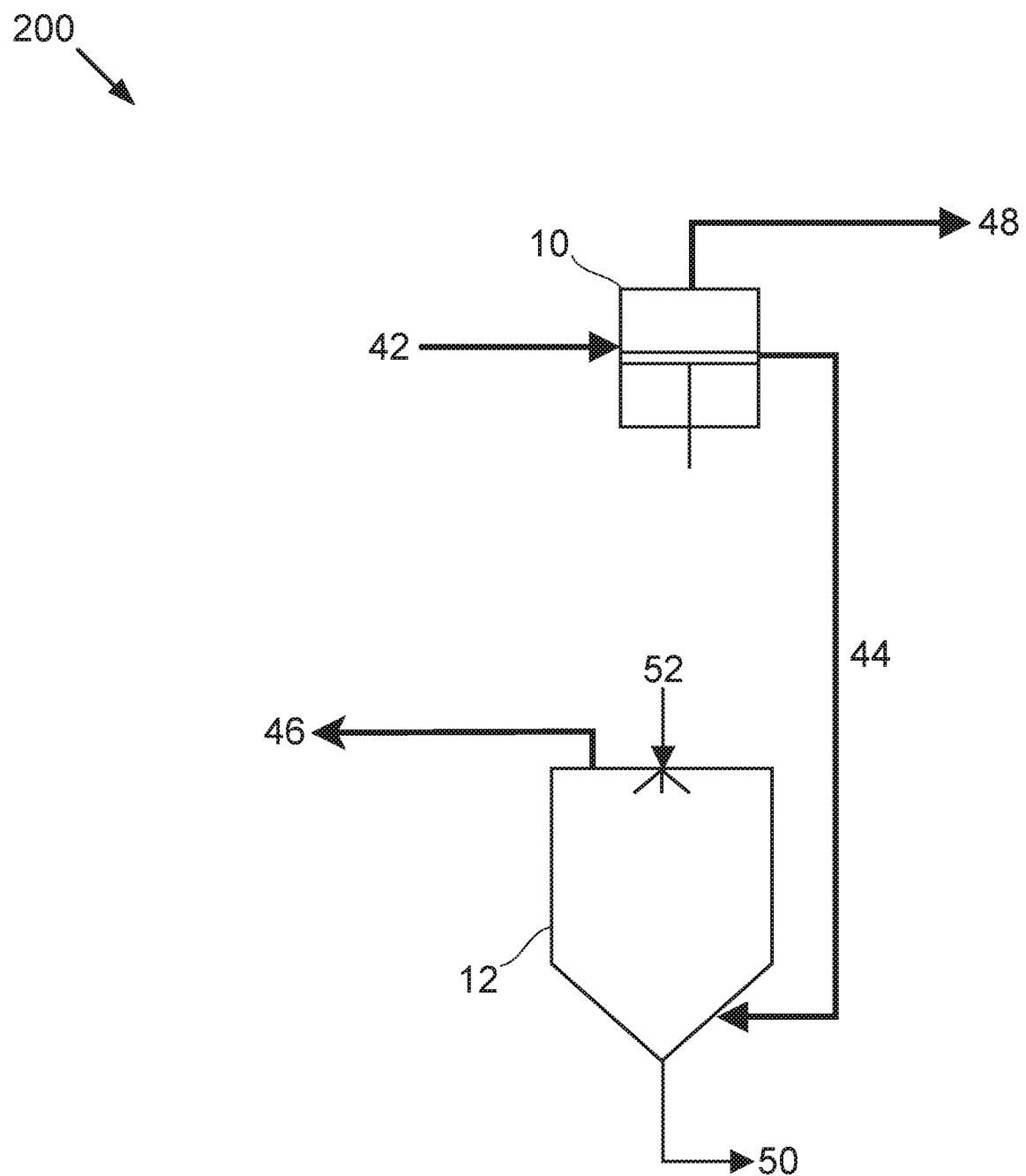
FIG. 2 is a process flow diagram showing a method for separating components as per one embodiment of the present invention.

Now referring to FIG. 2, FIG. 2 is a process flow diagram 200 showing a method for separating components as per one embodiment of the present invention. A process liquid stream 42, containing a first component and a second component, is passed into an expander 10. The process liquid stream 42 expands across the expander, causing the first component and a portion of the second component to vaporize, forming a process vapor stream 44. The remainder of the second component is cooled by the phase change sufficient to freeze to form a first solid product stream. The first solid product stream 48 is subsequently passed out of the expander. The first vapor stream 44 is passed to a desublimating direct-contact heat exchanger 12 where it is cooled by contact with a contact liquid stream 52. The cooling causes at least a portion of the remaining second component to desublimate out as a second solid product, which becomes entrained in the contact liquid stream 52, resulting in a slurry stream 50. The first vapor stream 44 leaves as a second vapor stream 46.

Now referring to FIG. 3, FIG. 3 is a block diagram 300 showing a method for separating components as per one embodiment of the present invention. At 301, a process liquid stream, containing first and second components, is passed into an expansion device. At 302, the process liquid stream is expanded across the expansion device such that the first component and a first portion of the second component vaporize to form a process vapor stream and a second portion of the second component freezes to form a first solid product stream. At 303, the first solid product stream is passed out of the expansion device. At 304, the process vapor stream is passed into a direct-contact heat exchanger against a contact liquid stream. At 305, the first portion of the second component is desublimated into the contact liquid stream as a second solid product stream. The contact liquid stream and the second solid product stream leave the direct-contact heat exchanger as a slurry stream while the process vapor stream leaves the direct-contact heat exchanger as a stripped process vapor stream.

Now referring to FIG. 4, FIG. 4 is a block diagram 400 showing a method for separating components as per one embodiment of the present invention. At 401, a supercritical stream of a first component and a second component is passed through a first ICHE where it is cooled isobarically to near the freezing point of the second component, resulting in a process liquid stream. At 402, the process liquid stream is passed into an expansion device. At 403, the process liquid stream is expanded across the expansion device such that the first component and a first portion of the second component vaporize to form a process vapor stream and a second portion of the second component freezes to form a first solid product stream. At 404, the first solid product stream is passed out of the expansion device. At 405, the process vapor stream is passed into a direct-contact heat exchanger against a contact liquid stream. At 406, the first portion of the second component is desublimated into the contact liquid stream as a second solid product stream. The contact liquid stream and the second solid product stream leave the direct-contact heat exchanger as a slurry stream while the process vapor stream leaves the direct-contact heat exchanger as a stripped process vapor stream. At 407, the stripped process vapor stream is compressed, resulting in a first product liquid stream. At 408, the first product liquid stream is warmed across the first ICHE. At 409, the slurry stream is separated into a warm contact liquid stream and the second solid product stream. At 410, the warm contact liquid stream is cooled to produce the contact liquid stream. At 411, the first and second solid product streams are combined, melted, and pressurized to produce a second product liquid stream. At 412, the second product liquid stream is warmed across the first ICHE.

In some embodiments, the first component consists of a hydrocarbon selected from the group consisting of methane, ethane, propane, isobutane, n-butane, and combinations thereof. In some embodiments, the first component also includes N2, He, H2S, hydrocarbons with 5 or more carbons, H2O, CO2, or combinations thereof. In some embodiments, the second component consists of an acid gas selected from the group consisting of carbon dioxide, sulfur oxides, nitrogen oxides, carbon monoxide, and combinations thereof. In some embodiments, the contact liquid consists of a compound selected from the group consisting of hydrocarbons that form liquids in the temperature ranges needed, water-alcohol solutions, and combinations thereof. The contact liquid is a liquid in the required temperature ranges without substantial vaporization or freezing.

In some embodiments, the expansion device is selected from the group consisting of an expander, an expansion valve, a piston, a drum, a turbine, an expansion chamber, and combinations thereof.

The invention has been described with reference to various specific and preferred embodiments and techniques. Nevertheless, it is understood that many variations and modifications may be made while remaining within the spirit and scope of the invention.

What is claimed is:

1. A system for separating components comprising:
    a first indirect-contact heat exchanger having an inlet configured to receive a process fluid stream comprising a first component and a second component, said first indirect-contact heat exchanger configured to cool the process fluid stream to form a process liquid stream, the first indirect-contact heat exchanger including a liquid stream outlet;
    an expansion device having a liquid stream inlet in fluid communication with the liquid stream outlet of the first indirect-contact heat exchanger, the expansion device configured to expand the process liquid stream such that the first component and a first portion of the second component vaporize to form a process vapor stream and a second portion of the second component freezes to form a first solid product stream, wherein the expansion device is configured to expand the process liquid stream by decreasing a pressure of the process liquid stream, the expansion device further comprising a vapor outlet to allow passage of the process vapor stream out of the expansion device and a solid stream outlet to allow passage of the first solid product stream out of the expansion device;
    a desublimating heat exchanger having a vapor stream inlet configured to receive the process vapor stream from the vapor outlet of the expansion device and configured to pass the process vapor stream across a contact liquid stream such that the first portion of the second component desublimates into the contact liquid stream as a second solid product stream;
    the desublimating heat exchanger further configured to pass the second solid product stream and the contact liquid stream out as a slurry stream in a solid stream outlet of the desublimating heat exchanger;
    the desublimating heat exchanger having a vapor stream outlet configured to pass the process vapor stream out as a stripped process vapor stream;
    a compressor having a vapor stream inlet configured to receive the stripped process vapor stream, the compressor configured to compress the stripped process vapor stream to form a primary product liquid stream, said compressor having a liquid stream outlet configured to direct the primary product liquid stream to the first indirect-contact heat exchanger, said first indirect-contact heat exchanger further configured to warm the primary product liquid stream against the process fluid stream;
    the system further comprising a second indirect-contact heat exchanger having a solid stream inlet configured to receive the first solid product stream from the expansion device and the second solid product stream from the desublimating heat exchanger, where the first solid product stream is combined with the second solid product stream at a junction prior to entering the second indirect-contact heat exchanger to form a combined solid product stream, wherein the second indirect-contact heat exchanger is configured to melt the combined solid product stream to form a secondary product liquid stream, said first indirect-contact heat exchanger further configured to warm the secondary product liquid stream against the process fluid stream.

2. The system of claim 1, wherein the first component comprises a hydrocarbon selected from the group consisting of methane, ethane, propane, isobutane, n-butane, and combinations thereof.

3. The system of claim 2, wherein the second component comprises an acid gas selected from the group consisting of carbon dioxide, sulfur oxides, nitrogen oxides, carbon monoxide, and combinations thereof.

4. The system of claim 1, wherein the first indirect-contact heat exchanger is configured to receive and cool a supercritical process fluid stream to form the process liquid stream.

5. The system of claim 4, wherein the expansion device is further configured to provide power that drives the compressor.

6. The system of claim 1, further comprising a solid-liquid separator configured to separate the slurry stream into a warm contact liquid stream and the second solid product stream.

7. The system of claim 6, further comprising a contact liquid stream cooler configured to cool the warm contact liquid stream to form the contact liquid stream.

* * * * *